Patented June 18, 1940

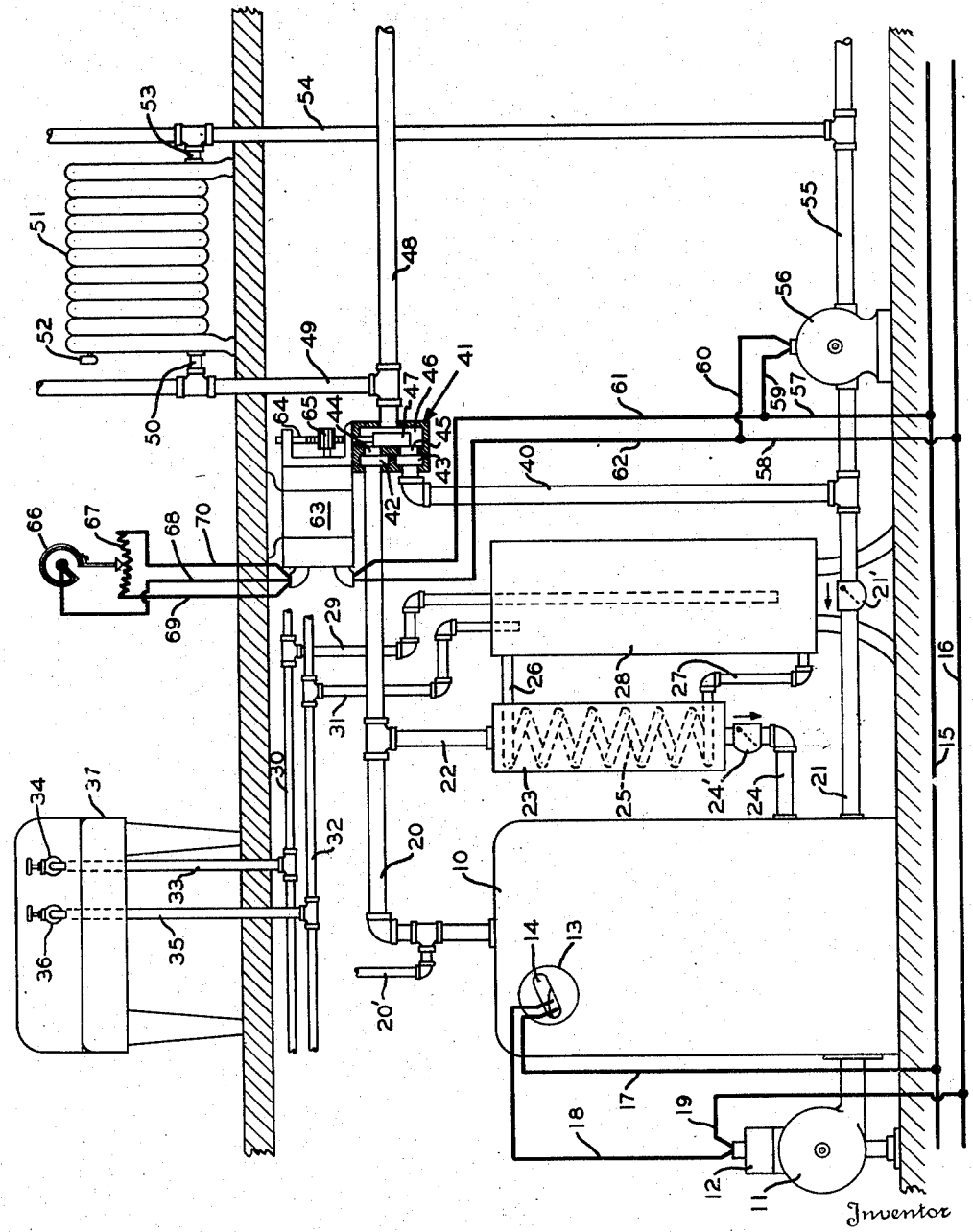

2,204,708

UNITED STATES PATENT OFFICE 2,204,708

HEATING SYSTEM

Frederic H. Smith, Haverhill, Mass., assignor to Minneapolis-Honeywell Regulator Company, Minneapolis, Minn., a corporation of Delaware Application March 25, 1935, Serial No. 12,865

6 Claims. (Cl. 237—8)

This invention relates to heating systems and more particularly to hot water heating systems embodying a constant temperature boiler, an indirect heater associated therewith for heating water for domestic purposes and a radiator associated therewith for heating a room.

In this type of system, it is usual to provide a hot water boiler, a heating means therefor which is controlled by a thermostat responsive to boiler temperature, means for conveying hot water from the boiler to a space to be heated, "on and off" means in the conveying means commanded by a space thermostat for controlling the temperature of the space to be heated, and means for conveying hot water from the boiler to an indirect heater for heating water for domestic purposes.

This type of system gives fairly good results but it is subject to various inherent drawbacks and disadvantages for every time the "on and off" means is called into action to permit the conveyance of hot water from the boiler to the radiators, there is bound to be a shot of hot water delivered to the radiators followed by much cooler water, causing the existence of uneven temperature conditions. Also, due to the use of "on and off" means in the hot water conveying means, the radiators are heated to a high degree and then allowed to cool to a low degree, giving large fluctuations in radiator temperature and consequent unevenness in room temperature.

It is therefore an object of this invention to provide a heating system of the class described wherein unevenness of radiator and room temperature is eliminated by providing a means in the heating fluid conveying means that may be modulated from one position to another under the command of a room thermostat whereby the radiators are maintained at a uniform temperature during the existence of a given condition in the room to be heated.

Another object is to provide a heating system of the class described, having a boiler, radiators for heating a space, conveying means for conveying hot water to and from the radiators, by-pass means around the boiler and means under the command of a room thermostat for controlling the by-pass means to deliver water at a predetermined temperature to the radiators whereby the temperature of the radiators is maintained uniform for a given condition existing in the space to be heated.

A still further object is to provide a heating system of the class described having a boiler and an indirect heater heated thereby for heating water for domestic purposes along with radiators for heating a room, conveying means for conveying hot water from the boiler to the radiators of the room, by-pass means around the boiler and the indirect heater and control means under the command of the room thermostat for controlling the by-pass means to deliver water of a predetermined temperature to the radiators of the room whereby the temperature of the radiators is varied according to variations in the room temperature.

Other objects and advantages will become apparent to those skilled in the art by referring to the accompanying specification, claims and drawing in which drawing there is diagrammatically illustrated a heating system which exemplifies the preferred form of my invention.

Although this heating system is of general utility and may be applied to steam heating systems and hot air heating systems, it is shown for purposes of illustration and not of limitation as applied to a hot water heating system.

In this system, 10 designates a hot water boiler of the usual construction which is heated by an electrically driven oil burner 11. The electrically driven oil burner 11 has the usual safety switches and control mechanism therefor located in the control box 12, located on the oil burner 11. Mounted in the boiler 10 is a condition responsive device 13 preferably in the form of a thermostatic device which is old in the art and needs no further explanation at this point. The thermostatic control device 13 operates a mercury switch 14 that has the usual electrodes to be engaged by mercury upon the tilting of the switch 14.

Line wires 15 and 16 lead from some power source not shown and wire 15 is connected by means of wire 17 to one of the electrodes of the mercury switch 14 of the thermostatic control device 13. The other electrode of mercury switch 14 is connected by means of a wire 18 to the oil burner control 12 which in turn is connected by means of a wire 19 to the line wire 16.

With these parts in the position as shown in the drawing, the mercury switch 14 is closed because of low temperature conditions existing in the boiler. When the mercury switch 14 is so closed, energy is delivered from the line wire 15 through wire 17, mercury switch 14, wire 18, controller 12 and wire 19 back to the line wire 16 to operate the electrically operated oil burner 11. Upon a rise in temperature in the boiler 10 to a predetermined value as a result of operation of the oil burner 11, mercury switch 14 is tilted to an open position to break the above circuit to stop the oil burner 11. By means of this thermostatic control element 13 which controls the operation of the oil burner 11, the heating fluid in the boiler 10 is maintained at a substantially constant temperature. A pipe 20' leading to an expansion tank or like device is connected into the hot water header 20 to permit the expansion and contraction of the water in the system in a manner well known in the art.

Connected to the upper portion of the boiler 10 is a hot water supply header 20 and connected to the lower portion of the boiler 10 is a return water header 21. An indirect heater is designated at 23 and is connected to the boiler 10 preferably by means of a pipe 22 connected to the hot water supply header 20 and a pipe 24 connected directly to the lower portion of the boiler 10. It is conceivable that the pipe 22 instead of being connected to the hot water supply header 20 may be connected to the upper portion of the boiler 10 and the pipe 24 instead of being directly connected to the lower portion of the boiler 10 may be connected to the return header 21. Located in the pipe 24 leading from the indirect heater 23 to the boiler 10 is a check valve 24' which opens downwardly to permit the flow of water from the indirect heater 23 to the boiler 10 and prevents flow of water from the boiler 10 therethrough to the indirect heater 23.

Located in the indirect heater 23 is a coil 25, one end of which is connected by means of a pipe 26 to the upper end of a storage tank 28 and the lower end of which is connected by means of a pipe 27 to the lower end of the storage tank 28.

Water is supplied to the storage tank 28 by means of a pipe 29 connected to a cold water supply 30 and hot water for domestic purposes is drawn from the storage tank 28 by means of a pipe 31 connected to a hot water supply pipe 32. A cold water riser 33 is connected to the cold water supply pipe 30 whereby cold water may be supplied to a point of use such as a sink 37 through the cold water faucet 34. Hot water is obtained from the hot water supply pipe 32 through a hot water riser 35 and the hot water faucet 36 for use at a point such as the sink 37.

Due to the fact that the temperature of the boiler water in the boiler 10 is maintained constant, the temperature of the heating water in the indirect heater 23 is also maintained constant to maintain constant the temperature of the domestic water located in the storage tank 28 which provides for hot water at a constant temperature at all times for domestic purposes.

Connected to the return pipe 21 is a by-pass pipe 40 which leads upwardly therefrom to a three-way mixing valve generally designated at 41. This three-way mixing valve 41 has a hot chamber 42 and a cold chamber 43 which are separated from each other by a suitable partition. The chambers 42 and 43 are provided with ports 44 and 45 respectively which open into a mixing chamber 46. Slideably mounted in the mixing chamber 46 is a control valve 47 which may take the form of a slide valve to control the relative openings of ports 44 and 45. The valve and ports are so arranged that when port 45 is fully closed, port 44 is fully open and when port 44 is fully closed, port 45 is fully open. Movement of the valve 47 between these extreme positions opens ports 44 and 45 more or less depending on the position of the valve 47. By this construction, more or less water from the hot water supply pipe 20 or more or less cold water from the by-pass pipe 40 is admitted to the mixing chamber 46.

Connected into the mixing chamber 46 is a pipe or header 48 to which are connected risers 49, only one of which is shown in the drawing. Connected to the riser 49 is a pipe 50 leading into a heat exchanger, preferably in the form of a radiator 51 which is provided with the usual air vent 52. The pipes 50 may contain orifices therein whereby the proportionate amount of heating fluid delivered to the various radiators may be determined. Leading from the heat exchanger or radiator 51 is a pipe 53 connected to a return riser 54 which in turn is connected to a return pipe 55 for returning the heating fluid from the radiator to the boiler. Located between the return pipe 55 and the return pipe 21 and ahead of the by-pass pipe 40 is a motor operated circulating pump 56 which, in this preferred form of the invention, is constantly energized during the time the heating system is in operation. Although a circulating pump is shown and described, heating fluid could be circulated through the system by gravity. The circulating pump, however, insures circulation and better performance. A check valve 21' is located in the return header 21 between the boiler 10 and the by-pass pipe 40 to prevent the flow of hot water from the boiler 10 through the header 21 into the by-pass pipe 40.

The motor operated circulating pump 56 is energized by means of wires 57 and 58 which are connected to the line wires 15 and 16 and wires 59 and 60 which are connected respectively with the wires 57 and 58 and the motor operated circulating pump 56. As long as energy is being supplied to the line wires 15 and 16, the motor operating circulating pump 56 is maintained in operation.

Due to the fact that the motor operated circulating pump 56 is not started and stopped to effect a control in this system, it may be of lighter weight and construction since it is not subject to the usual severe starting torques. However, if it is desirable to start and stop the motor operated circulating pump 56 under the control of some condition, it is within the contemplation of this invention to have it so started and stopped.

Referring now to the heating system as it relates to supplying heat to the radiator 51, a closed system is provided from the boiler 10 by means of the hot water header 20, three-way mixing valve 41, pipe 48, riser 49, pipe 50, radiator 51, pipe 53, return riser 54, return pipe 55, circulating pump 56 and return pipe 21 back to the boiler 10. Heating fluid is preferably circulated through this closed system by means of the circulating pump 56.

By reason of the by-pass pipe 40 being connected to the return pipe 21 and to the three-way mixing valve 41 some or all of the heating fluid so circulated by the circulating pump 56 may be by-passed through the by-pass pipe 40 around the boiler 10. By suitably manipulating the slide valve 47 of the three-way mixing valve 41 to vary the effective sizes of the port openings 44 and 45, more or less water may be delivered from the hot water header 20 and from the by-pass pipe 40 into the hot water pipe 48. Upon raising the valve 47, more cool by-passed water from the by-pass 40 is allowed to enter the pipe 48 and less hot water from the boiler 10 is allowed to enter the pipe 48. By lowering the valve 47, reverse action takes place, permitting more hot water from the boiler 10 to enter the pipe 48 and less cool water from the by-pass pipe 40 to enter the passage 48. Therefore, it is seen that by suitably positioning the valve 47 in relation to the ports 44 and 45, water at a desired temperature is directed into the pipe 48 for distribution to the heat exchangers or radiators 51.

The valve 47 of the three-way mixing valve 41 is moved in any number of given positions with respect to the ports 44 and 45 by means of a proportioning motor 63 which may be of the type shown and described in detail in U. S. Patent 1,989,972 granted to Lewis L. Cunningham on Feb. 5, 1935. Since the manner of operation of this proportioning motor 63 is completely disclosed in the Cunningham patent, specific reference thereto is not deemed necessary, it being sufficient to state that the valve 47 is moved upwardly and downwardly by means of a rack 64 and a pinion 65 associated therewith which is operated by the proportioning motor 63.

The proportioning motor 63 receives its energy by means of wires 61 and 62 connected respectively to wires 57 and 58 which in turn are connected respectively to wires 15 and 16 leading to a source of power not shown. The proportioning motor 63 is controlled and positioned by means of a control mechanism preferably in the form of a thermostat designated at 66. This thermostat 66 operates a slider arm over a potentiometer coil 67 to effect the variation and positioning of the proportioning motor 63. The thermostat is connected by means of wire 68 and each end of the potentiometer coil 67 is connected by means of wires 69 and 70 to the proportioning motor 63.

Upon an increase in temperature in the room or space to be heated, the thermostat 66 will be effected to slide the potentiometer slider across the potentiometer coil 67 to vary the resistances thereof to move the proportioning motor 63 a given amount which movement is reflected by means of rack 64 and pinion 65 to operate the valve 47. This specific operation is clearly pointed out in the Cunningham patent above referred to.

The operation of the total system is as follows: Due to the maintenance of a constant temperature or condition in the boiler 10 by means of the thermostatic device 13 controlling the electrically operated oil burner 11, domestic water at a constant temperature is always supplied. Assuming that the temperature in the room or space to be heated falls below a predetermined value, thermostat 66 will move its slider from the position shown to the left, varying the resistance in the potentiometer coil 67 which operates the proportioning motor 63 in the manner described in the Cunningham patent to rotate the pinion 65 to lower the rack 64 and the slide valve 47. Such lowering of the slide valve 47 increases the effective size of the port opening 44 and decreases the effective size of the port opening 45, permitting more hot water from the boiler 10 to enter the pipe 48 and permitting less cooler water from the by-pass pipe 40 from entering the pipe 48. By reason of this, the temperature of the water delivered into the pipe 48 is increased and when said water is sent to the heat exchangers or radiators 51 by the operation of the circulating pump 56, the temperature of the radiators 51 will be increased a like amount to restore the room temperature to the desired value.

If the temperature in the room increases above a desired value, the thermostat 66 will move the slider 67 from the left to the right over the potentiometer coil 57 to vary the resistances therein to position the proportioning motor 63 to rotate the pinion 65 to raise the rack 64 and the valve 47 thereby decreasing the effective size of the port opening 44 and increasing the effective size of the port opening 45. By this movement, more cool by-passed fluid from the by-pass pipe 40 is allowed to enter the pipe 48 and less warm fluid from the boiler 10 is allowed to enter the pipe 48 to decrease the temperature of the heating fluid in pipe 48. By reason of this decrease in temperature of the heating fluid in the pipe 48 and a consequent decrease in temperature in the radiators or heat exchangers 51, the room temperature will fall to the desired point.

By reason of the fact that the valve 47 is positioned in any number of positions with respect to the port openings 44 and 45 under the command and direction of the room thermostat 66, there is a modulating effect brought about for controlling the temperature of the hot water in the pipe 48 and in the radiators 51. By reason of this modulating or proportioning control, the temperature in the radiator 51 varies exactly as the demand for heat varies and consequently the room heated thereby is maintained more uniform than if a purely "on and off" control were used for controlling the temperatures in the radiator 51.

By use of the by-pass pipe 40, heavy drags on the boiler 10 are eliminated which prevent frequent starting and stopping of the oil burner 11 which tends to maintain the temperature of the heating fluid in boiler 10 constant. It is conceivable and also within the contemplation of this invention that the three-way mixing valve 41 may be located in the connection between the by-pass pipe 40 and the return pipe 21. Such a location would operate just as effectively and efficiently as the location illustrated. Also, it is within the contemplation of this invention to locate the circulating pump 56 in the supply pipe 48 to effect circulation of the heating fluid through the system. Such a location of the circulating pump 56 would be just as effective as the location illustrated in the drawing.

While one embodiment of the present invention has been shown and described in detail, many modifications will occur to those skilled in the art. It is intended in this application to cover all such modifications that fall within the scope of this invention as defined by the appended claims.

I claim as my invention:

1. In a heating system for heating a space, in combination, a boiler for heating a heating medium for said space, said boiler having an inlet and an outlet, a heat exchanger in heat exchange relationship with said space, conduit means for connecting said boiler inlet and outlet with said heat exchanger, a recirculating conduit associated with said conduit means for recirculating a portion of said heating medium through said heat exchanger without returning it to said boiler, valve means for controlling the proportions of heated medium from said boiler and recirculated medium passed through said heat exchanger, motor means for positioning said valve means, thermostatic means influenced by the temperature in said space for controlling said motor means in a manner progressively to increase in the proportion of heated medium from said boiler which is passed through said heat exchanger as the space temperature decreases and progressively to decrease in the proportion of heated medium which is passed through said heat exchanger as the space temperature increases, heating means for said boiler, and means responsive to the temperature of said boiler for placing said heating means into operation when boiler temperature falls to a predetermined low value, and for placing said heating means out of operation when boiler temperature rises to a higher value.

2. In a heating system for heating a space, in combination, a boiler for heating a heating medium for said space, said boiler having an inlet and an outlet, a heat exchanger in heat exchange relationship with said space, conduit means for connecting said boiler inlet and outlet with said heat exchanger, a recirculating conduit associated with said conduit means for recirculating a portion of said heating medium through said heat exchanger without returning it to said boiler, circulation control means for controlling the proportions of heated medium from said boiler and recirculated medium passed through said heat exchanger to thereby control the temperature of the medium flowing through said heat exchanger, thermostatic means influenced by space temperature for controlling said circulation control means in a manner progressively to increase the proportion of heated medium passed through said heat exchanger as the space temperature decreases and progressively to decrease the proportion of heated medium passed through said heat exchanger as space temperature increases, heating means for said boiler, and means responsive to the temperature of said boiler for placing said heating means into operation when boiler temperature falls to a predetermined low value and for placing said heating means out of operation when boiler temperature rises to a higher value.

3. In a combined heating system for heating a building and for supplying domestic hot water thereto, in combination, a boiler having an inlet and an outlet, a heat exchanger connected to said boiler in a manner to cause a circulation of boiler heating medium therethrough, said heat exchanger providing for heating said water, a building heat exchanger for heating said building, conduit means for connecting said boiler inlet and outlet with said building heat exchanger, a recirculating conduit associated with said conduit means for recirculating a portion of said heating medium through said building heat exchanger without returning it to said boiler, circulation control means for controlling the proportions of heated medium from said boiler and recirculated medium passed through said building heat exchanger to thereby control the temperature of the medium flowing through said building heat exchanger, thermostatic means influenced by space temperature for controlling said circulation control means in a manner to increase progressively the proportion of heated medium passed through said heat exchanger as the space temperature decreases and to decrease progressively the proportion of heated medium passed through said building heat exchanger as space temperature increases, heating means for said boiler, and means responsive to the temperature of said boiler for placing said heating means into operation when boiler temperature falls to a predetermined low value and for placing said heating means out of operation when boiler temperature rises to a higher value.

4. In a heating system for heating a space, in combination, a boiler for heating a heating medium for said space, said boiler having an inlet and an outlet, a heat exchanger in heat exchange relationship with said space, conduit means for connecting said boiler inlet and outlet with said heat exchanger, a recirculating conduit associated with said conduit means for recirculating a portion of said heating medium through said heat exchanger without returning it to said boiler, valve means for controlling the proportions of heated medium from said boiler and recirculated medium passed through said heat exchanger, motor means for positioning said valve means, thermostatic means located at a point remote from said motor means and influenced by the temperature in said space for controlling said motor means in a manner to increase in the proportion of heated medium from said boiler which is passed through said heat exchanger as the space temperature decreases and to decrease in the proportion of heated medium which is passed through said heat exchanger as the space temperature increases.

5. In a combined heating system for heating a building and for supplying domestic hot water thereto, in combination, a boiler having an inlet and an outlet, a heat exchanger connected to said boiler in a manner to cause a circulation of boiler heating medium therethrough, said heat exchanger providing for heating said water, a building heat exchanger for heating said building, conduit means for connecting said boiler inlet and outlet with said building heat exchanger, a recirculating conduit associated with said conduit means for recirculating a portion of said heating medium through said building heat exchanger without returning it to said boiler, circulation control means for controlling the proportions of heated medium from said boiler and recirculated medium passed through said building heat exchanger to thereby control the temperature of the medium flowing through said building heat exchanger, thermostatic means influenced by space temperature for controlling said circulation control means in a manner to increase the proportion of heated medium passed through said heat exchanger as the space temperature decreases and to decrease the proportion of heated medium passed through said building heat exchanger as space temperature increases.

6. Apparatus for controlling the heat supplied to a building by a hot water heating system from a source of heat comprising, in combination, means for continuously circulating the hot water through the heating system and the source of heat, conduit means providing a by-pass for the water around the source of heat, valve means in said conduit means, power means for operating said valve means, and remotely located means for controlling the valve operating means in response to variations in the temperature of the space in the building to be heated.

FREDERIC H. SMITH.